Jan. 19, 1932.  F. A. BOYLE  1,842,244
AUTOMOBILE VENTILATOR, WINDSHIELD, AND HANDWHEEL HEATER
Filed April 22, 1930
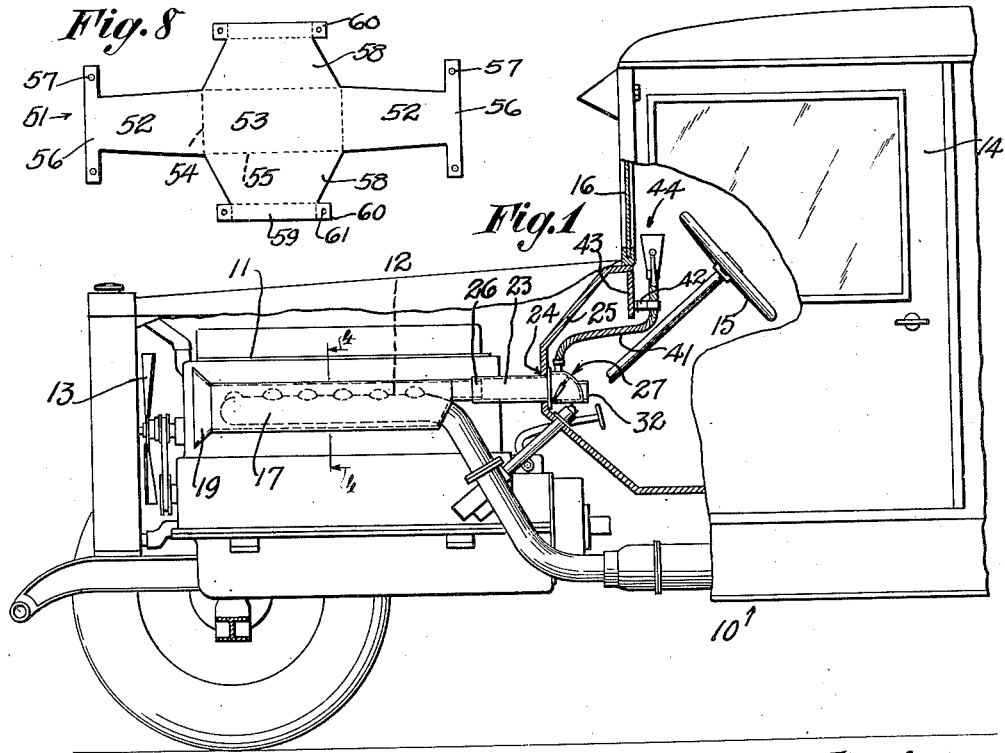
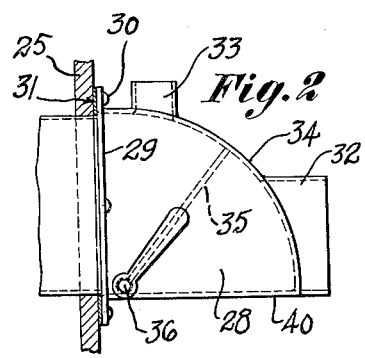
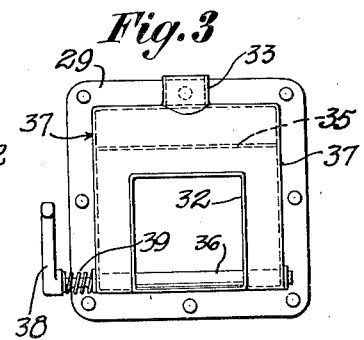
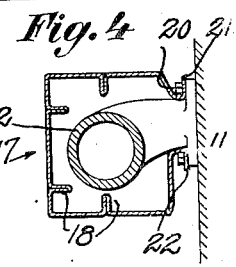
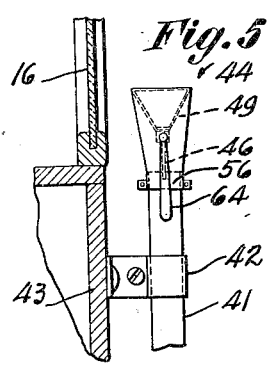
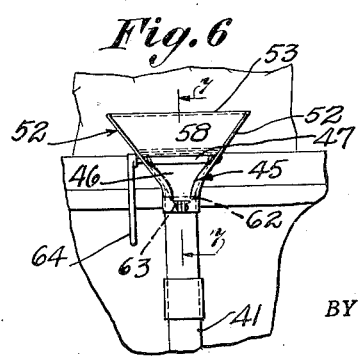
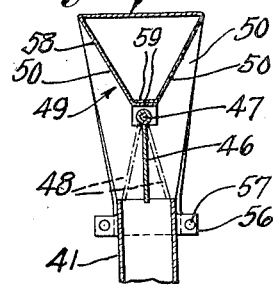
INVENTOR
Frank A. Boyle
BY
Miss Shumacher
ATTORNEY Patented Jan. 19, 1932

1,842,244

UNITED STATES PATENT OFFICE

FRANK A. BOYLE, OF POUGHKEEPSIE, NEW YORK

AUTOMOBILE VENTILATOR, WINDSHIELD, AND HANDWHEEL HEATER

Application filed April 22, 1930. Serial No. 446,271.

This invention relates to automobile ventilators, windshield, and handwheel heaters.

One object of the invention is to provide an improved heating means for an automobile handwheel and/or windshield, whether used alone or in combination with means for heating or ventilating the automobile.

Another object of the invention is to furnish an improved device of the character described having improved features of construction, which may include the heater deriving its heat from the exhaust manifold of the automobile engine, the control for regulating the flow of heated air from the heater into the automobile or to a nozzle to discharge the same upon the handwheel, or windshield, as well as the nozzle itself and the control thereof, whether these features are used alone or together.

Another object of the invention is to construct a device of the type mentioned having comparatively few and simple parts, which is relatively inexpensive to manufacture and assemble, which can be easily mounted in many types of automobiles, is convenient to operate, and affords a high degree of adjustability in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a typical view in side elevation of an automobile with parts removed to show therein a device embodying the invention.

Fig. 2 is an enlarged side view in vertical elevation of a valve and connecting device.

Fig. 3 is a front view thereof.

Fig. 4 is an enlarged vertical sectional view taken on line 4—4 of Fig. 1.

Fig. 5 is a fragmentary enlarged view of the invention showing the nozzle.

Fig. 6 is a front view thereof.

Fig. 7 is a vertical sectional view taken on line 7—7 of Fig. 6.

Fig. 8 is a plan view of a blank from which the nozzle is formed.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

Generally described, the invention provides a suitable heater which may be connected with the exhaust manifold of an automobile engine. A flow of air through the heater may be caused, for instance, by the engine cooling fan. According to this invention, the heater is preferably of one piece construction so as to be inexpensively manufactured, and it includes internal fins for efficiently heating the air therein. Connected with the heater is a two way flow regulator, which may comprise a single valve. By means of this flow regulator, the heated air may be directed into the automobile body to warm and ventilate the same or into an outlet means to direct the heated air against the windshield or the handwheel, or both, as may be required. While various constructions may be used at the outlet including one or more nozzles, I prefer to use a single novel nozzle arrangement for directing the air as stated. In this way the accumulation of frost on the windshield may be avoided, so that a clear and unobstructed vision may be had by the driver. Furthermore, the extreme inconvenience experienced by the driver in manipulating the handwheel in very cold weather is avoided.

Referring in detail to the drawings, 10 denotes an automobile of any conventional type to which the invention may be applied. To drive the automobile there is an engine 11 having an exhaust manifold 12, and a fan 13 at the front end thereof for cooling the engine. Also included in the automobile is a body 14 for the driver and passengers. A usual steering wheel 15 is provided, and a windshield 16 to protect the driver. While the automobile shown is of the closed type, it will be appreciated that the invention hereinafter described includes features which are applicable to other types of cars also.

Mounted along the exhaust manifold 12 is a casing or heater 17 in which air is heated by the manifold. While the heater may be variously formed, it preferably includes internal projections or fins 18 for imparting a maximum of heat to the air in the heater, and for causing a mixing of the air to assure efficient heating thereof. It will be understood that the heater may be externally insulated in any suitable manner. The fins receive heat by radiation from the hot exhaust manifold and provide increased surface for imparting the heat to the air passing through the heater.

At the forward end of the heater, the same includes a flared or entrance portion 19 that is in relative proximity to the fan, and whereby an efficient and relatively large inflow of air into the heater is caused at a considerable velocity. Since the efficiency of the air is a maximum at the periphery thereof, an ample supply of air is assured.

The heater may be constructed of a single piece of sheet metal, of any desired shape, or relatively oblong in cross section, and of sufficient size to preferably take around three sides of the manifold. To form the fins 18, a plurality of reverse folds are made in the metal, this being readily accomplished by suitable machinery. Even the entrance 19 may be integral with the heater. To secure the heater in place, bolts 20 may be used, which may engage the heater in any required manner, for instance, in the flanges 21, 22 of the heater.

Connected to the heater 17 is a tube 23, which may extend through an opening 24 in the wall 25 of the automobile. The tube 23 may be changed in length to suit the automobile construction, and may have telescopic engagement at 26 with the heater.

Communicating with the tube 23 is a flow regulator 27. The same may include a casing 28 having a flange 29 whereby the same is connected to the wall 25 by any suitable means such as screws 30. To seal the flange 29 tight with the wall 25, a gasket 31 may be interposed between the same. While the tube 23 may be secured to the casing 28, it may also be separate therefrom, the object being in any case to permit a connection through a square opening 24 in the said wall, and further, the utilization of any existing opening 24 that may have been used for a previous heater. It may in some instances be desirable to make the tube 23 adjustable in cross section to suit the opening 24, or the flange 29 may be relied upon for the sealing engagement at said opening.

The casing 28 is provided with a plurality of openings 32, 33 of suitably varying sizes. The flow regulator is constructed so as to cause a flow of air to one or both of said openings, or to cut off the flow of air completely. Thus the casing 28 may be in the form of a sector of a circle, thus providing a circular wall 34 with which a valve 35 pivotally mounted at 36 may make contact. The said pivot 36 may be in the form of a pin journaled in the side rollers 37 of the casing 28. On one end of the pin is a handle 38 which may be in the nature of a foot operated member. A compression coil spring 39 or equivalent means may take around the pin 36 between the handle 38 and the adjacent side wall of the casing so as to afford frictional holding engagement.

It will now be seen that when the valve 35 is in the position shown in Fig. 2, air is free to flow from the casing 28 outward through the opening 33. But no air flow may occur to the outlet 32. When the valve is moved downward, for instance, to lie adjacent to the lower wall 40 of the casing, air will flow through both of the outlets 32 and 33. If, however, it is desired to cut off the flow of air through the said outlets, then the valve 35 is moved into upright position, in which case it will be in front of both of the outlets.

Communicating with the outlet 33 is a tube 41 which is preferably in the nature of a flexible connection to conform to the shape of the body of the car. At its upper end there is a bracket 42 in engagement therewith and secured to the dash board 43. Connected to the upper end of the tube 41 is a novel outlet means 44 that will now be described, the same being supported by the bracket 42.

The outlet 44 is constructed to throw heated air against the windshield 16 or the wheel 15, or both, as may be desired. The outlet may be described as having a single nozzle with a deflector at the mouth thereof for throwing the air against either the windshield or the handwheel for distributing and dividing the air stream; and it may also be described as including a plurality of nozzles contained in an improved unitary construction for varying the direction of flow and distribution of the air as mentioned. The said outlet may be of tapered form so as to give a flaring projection of air upon the windshield. Intercommunicating the outlet with the tube 41 is an opening 45 at which is disposed a deflector portion or valve 46 which may be pivotally mounted at 47 to be movable into the dotted line positions 48. Surrounding the valve 46 is a main deflector portion 49 having diverging surfaces 50. When the valve 46 is central as shown in Fig. 7, the air will flow equally upon both sides thereof so as to be supplied both to the windshield and to the handwheel. When the valve is thrown toward the right, all of the air will be directed against the windshield, and when the valve is moved toward the left, all of the air will be directed against handwheel. By suitably positioning the outlet means with respect to the windshield and the handwheel, an efficient heating action by the air can be accomplished with respect to both of those parts.

The outlet may be constructed of a single blank of sheet material 51, the same including two end sections 52 and a central section 53 alined therewith, the central section being defined by the dotted lines 54, 55. At the ends of the end sections are strap portions 56 to clamp around the upper end of the tube 41 and to be interconnected at the holes 57. On each side of the central section 53 are the trapezoidal sections 58, the same having end portions 59 which in the finished device overlap each other, and the portions 59 having projections 60 operated at 61 so as to receive the pivot pin 47. By folding the blank 51 along the dotted lines, the outlet shown in Figs. 6 and 7 is readily obtained. Thus a simplified means of constructing the outlet is effected, and one which is also light and inexpensive in material. However, it will be appreciated that the outlet may be formed of any suitable material and may be cast, molded, or otherwise produced.

The valve 46 has its lower portion 62 tapered as shown in dotted lines in Fig. 6 so as to conform to the shape of the outlet. The lower end 63 of said valve is rounded in order to coact properly with the round cross section of the tube 41. To afford convenient manipulation of the valve 46, a handle 64 is connected to the pin 47. The valve may be retained in said position in any suitable manner, either frictionally or by means of a catch. It is aimed by this invention to utilize as few parts as possible, and it will thus be understood that various changes and modifications may be made in the device and other parts or connections interposed or added if that should be necessary.

The operation of the device will now be clearly apparent. When the engine is hot, air blown by the fan 13 into the entrance 19 and thence through the heater 18 is heated up to a uniform and efficient degree and affords a constant and clean supply of air. With the device positioned as shown in the drawings, a flow of air to the outlet 32 and thence into the automobile body will be prevented, but all of the air will flow through the opening 33 and thence through the tube 41 to the outlet 44. With the valve 46 centrally positioned, one portion of the air will be directed against the windshield and the other against the handwheel. If all of the heated air is desired against either the windshield or the handwheel, the valve 46 is moved in the corresponding direction. If a portion of the heated air is to be directly received in the automobile body, the valve 35 is moved downward. Of course the size of the opening 33 and of the tube may be made according to any desired capacity thereof. Where the heater has sufficient capacity, and that capacity is to be utilized for heating a maximum volume of air, then of course the valve 35 would have to be moved downward for a flow of air through both of the openings 32 and 33.

It will be appreciated that various changes and modifications may be made in the device as shown in the drawing, and that the same is submitted in an illustrative and not in a limiting sense, the scope of the invention being defined in the following claims.

I claim:

1. A distributing nozzle including an outlet means, a fixed deflector secured in spaced relation in front of said outlet means, and a movable deflector between the outlet means and the fixed deflector arranged to cause fluid from the former to be projected upon one or another side of the fixed deflector.

2. A distributing nozzle including an outlet, a swingable plate valve at said outlet arranged to cause a flow in one or an opposite direction from the outlet, and a wedge shaped deflector arranged in front of the outlet so that the fluid from the outlet and valve flow along one or an opposite side of the deflector.

3. A distributing nozzle including an outlet, a swingable plate valve at said outlet arranged to cause a flow in one or an opposite direction from the outlet, and a deflector disposed beyond said valve and separate therefrom for further deflecting the fluid received from said outlet, said deflector having portions for deflecting the fluid in one or an opposite direction.

In testimony whereof I affix my signature.

FRANK A. BOYLE.